United States Patent [19]

Ueno et al.

[11] Patent Number: 5,692,593
[45] Date of Patent: Dec. 2, 1997

[54] METHOD OF AND APPARATUS FOR AUTOMATICALLY CONVEYING WORKPIECES

[75] Inventors: Tugio Ueno; Ken Tazo; Jun Yamada, all of Sayama, Japan

[73] Assignee: Honda Giken Kogyo Kabushiki Kaisha, Tokyo, Japan

[21] Appl. No.: 575,616

[22] Filed: Dec. 20, 1995

[30] Foreign Application Priority Data

Dec. 20, 1994 [JP] Japan ................................. 6-316920

[51] Int. Cl.⁶ .................................................. B65G 37/00
[52] U.S. Cl. ........................ 198/369.2; 198/435; 198/437; 198/464.1
[58] Field of Search ........................... 198/435, 437, 198/369.1, 369.2, 369.6, 460.1, 461.3, 461.2, 464.1, 464.2

[56] References Cited

U.S. PATENT DOCUMENTS 3,416,640  12/1968  Svobida .......................... 198/437 X
4,281,756  8/1981   Bruno ............................ 198/369.2
4,282,964  8/1981   Hogenkamp ..................... 198/369.2 X
4,867,299  9/1989   Fukuoka et al. .................. 198/435
5,078,255  1/1992   Haley ............................ 198/369.2 X

FOREIGN PATENT DOCUMENTS 6-254639  9/1994  Japan .

*Primary Examiner*—James R. Bidwell
*Attorney, Agent, or Firm*—Birch, Stewart, Kolasch & Birch, LLP

[57] ABSTRACT

An automatic conveying apparatus has a lower conveyor, an upper conveyor, and a distribution conveyor. The upper conveyor is associated with a first photoelectric sensor, and the lower conveyor is associated with a second photoelectric sensor. A workpiece delivered from a transfer press at a first speed $V_1$ is fed onto the distribution conveyor which is actuated also at the first speed $V_1$. After the first photoelectric sensor or the second photoelectric sensor is turned on by the workpiece until it is turned off, the workpiece is conveyed at a second speed $V_2$ greater than the first speed $V_1$ by the distribution conveyor. The workpiece is transferred from the distribution conveyor to the lower conveyor or the upper conveyor which is actuated at the second speed $V_2$.

8 Claims, 5 Drawing Sheets

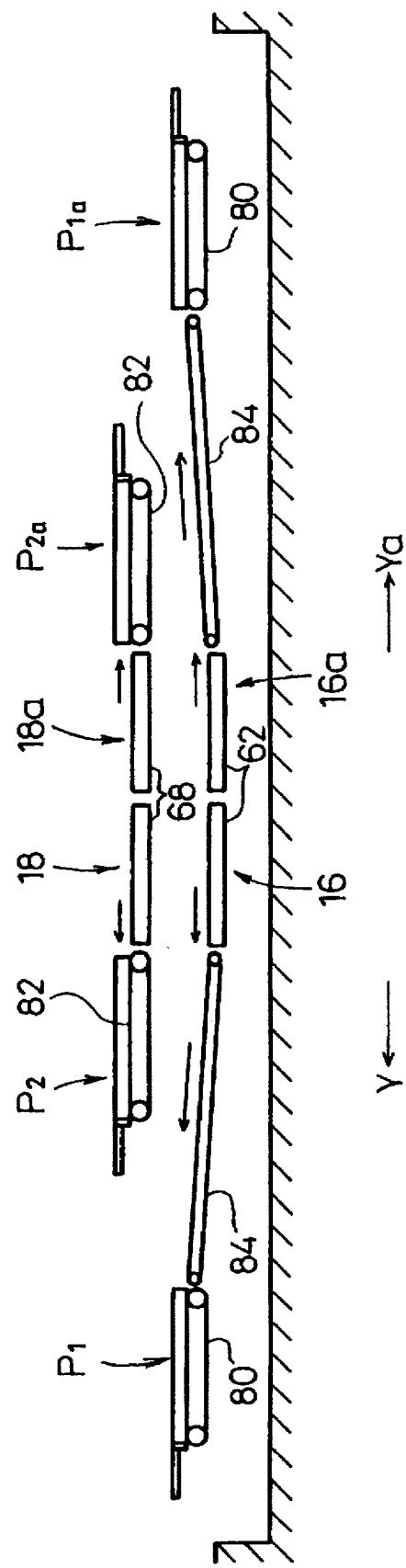

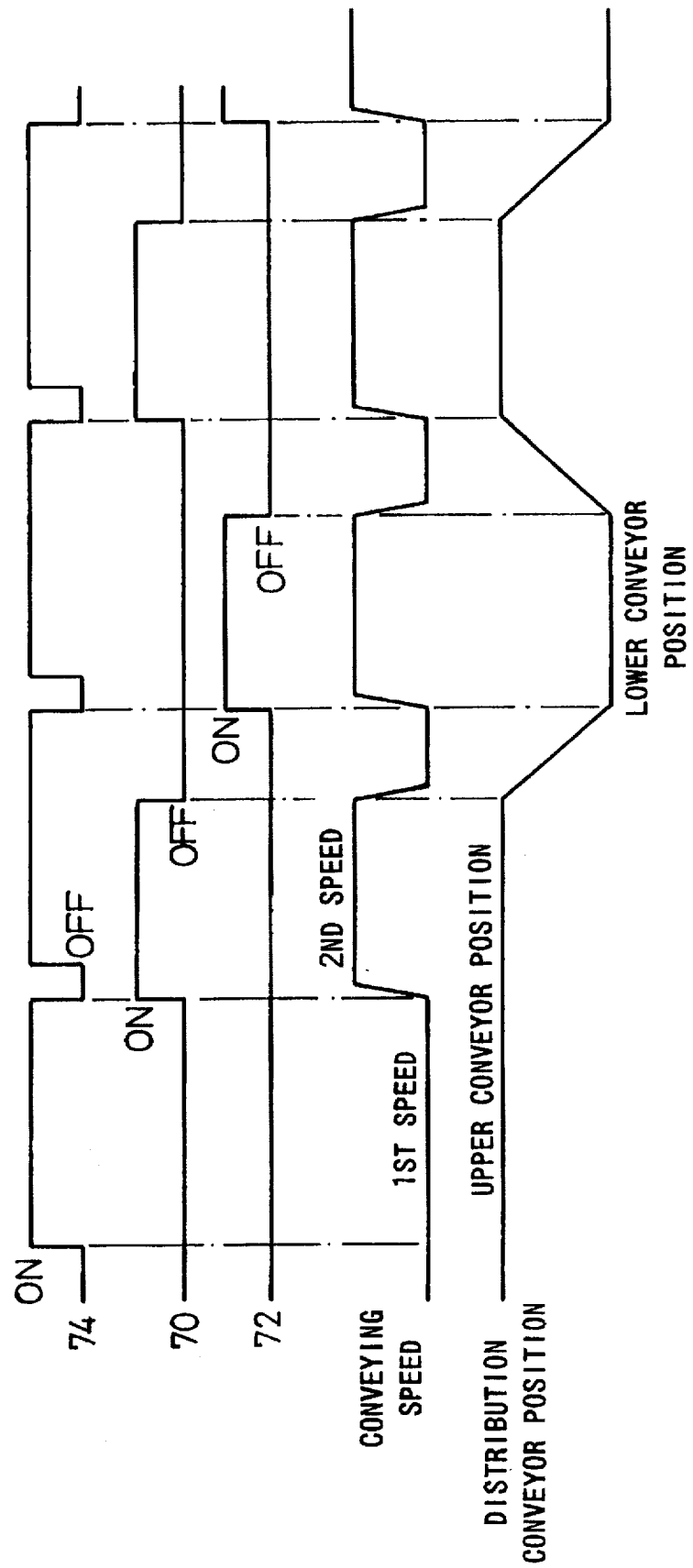

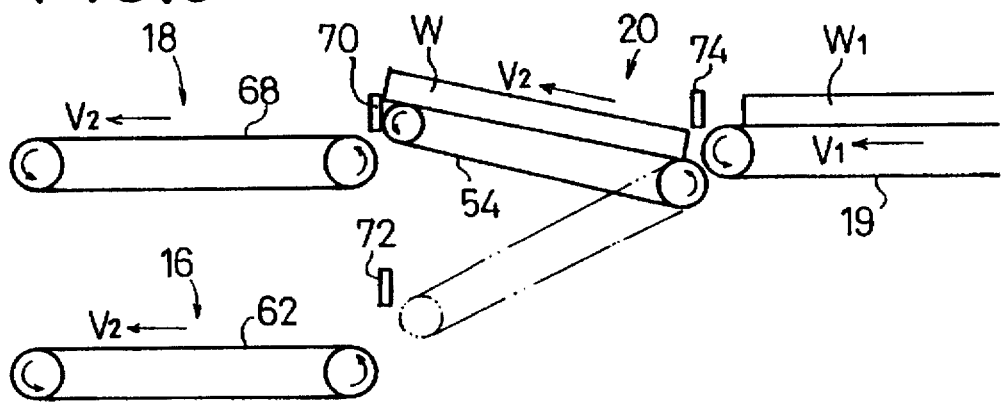
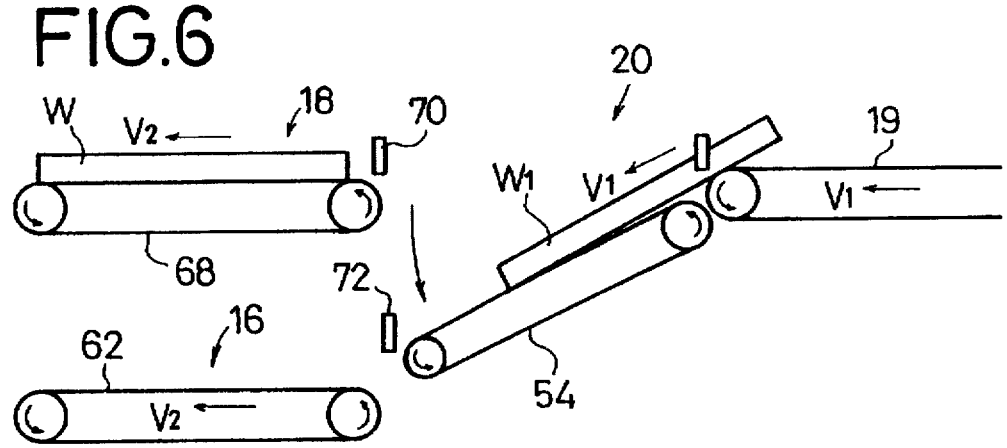
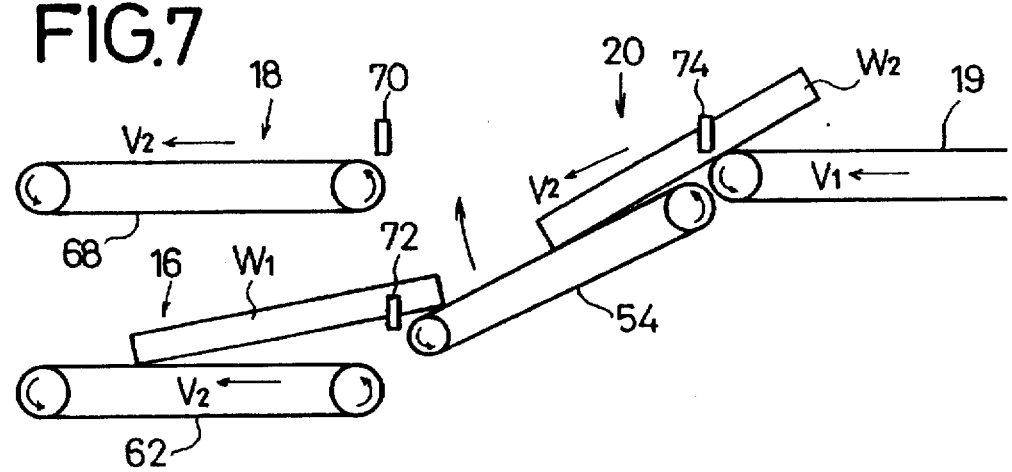

5,692,593

1

METHOD OF AND APPARATUS FOR AUTOMATICALLY CONVEYING WORKPIECES

BACKGROUND OF THE INVENTION

1. Field of the Invention

The present invention relates to a method of and an apparatus for automatically distributing and conveying workpieces delivered from a press to first and second conveyors which are disposed respectively in two vertically spaced positions.

2. Description of the Related Art

Various apparatus have been used for automatically loading pallets with workpieces such as panels delivered from a transfer press. One known apparatus of this type is disclosed in Japanese laid-open patent publication No. 6-254639. According to the disclosed apparatus, workpieces intermittently fed at relatively short time intervals from a press are distributed to two vertically spaced conveyors by a distribution conveyor, and then automatically loaded onto pallets by a plurality of transfer machines. The disclosed apparatus is designed to be a space saver and increase the efficiency with which to convey workpieces.

It has been desirable for the apparatus of the type described above to be able to handle effectively various kinds of workpieces having different dimensions and shapes. When workpieces which are elongate in the conveying direction are to be efficiently distributed and conveyed, the workpieces are necessarily conveyed at relatively short time intervals. Therefore, when a subsequent workpiece is distributed to either one of the upper and lower conveyors after a previous workpiece has been transferred to the conveyors, the leading end of the next workpiece projects from the distribution conveyor, and tends to be caught by the upper conveyor, for example, with the result that the apparatus fails to distribute and convey the workpiece. If the workpieces are spaced sufficiently widely from each other, then the speed of operation of the press has to be lowered, and the efficiency of the press cannot be increased.

SUMMARY OF THE INVENTION

It is a general object of the present invention to provide a method of and an apparatus for automatically distributing and conveying various types of workpieces without a reduction in the efficiency of a press with which the apparatus is combined.

The above and other objects, features, and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 3 is a schematic front elevational view of conveyors of the automatic conveying apparatus;

FIG. 4 is a timing chart illustrative of a sequence of an automatic conveying method according to the present invention;

2

FIG. 5 is a schematic side elevational view showing the distribution conveyor which is directed to the upper conveyor;

FIG. 6 is a schematic side elevational view showing the distribution conveyor which is directed to the lower conveyor; and FIG. 7 is a schematic side elevational view showing the distribution conveyor which is to be turned upwardly.

DETAILED DESCRIPTION OF THE PREFERRED EMBODIMENT

Figure 1:
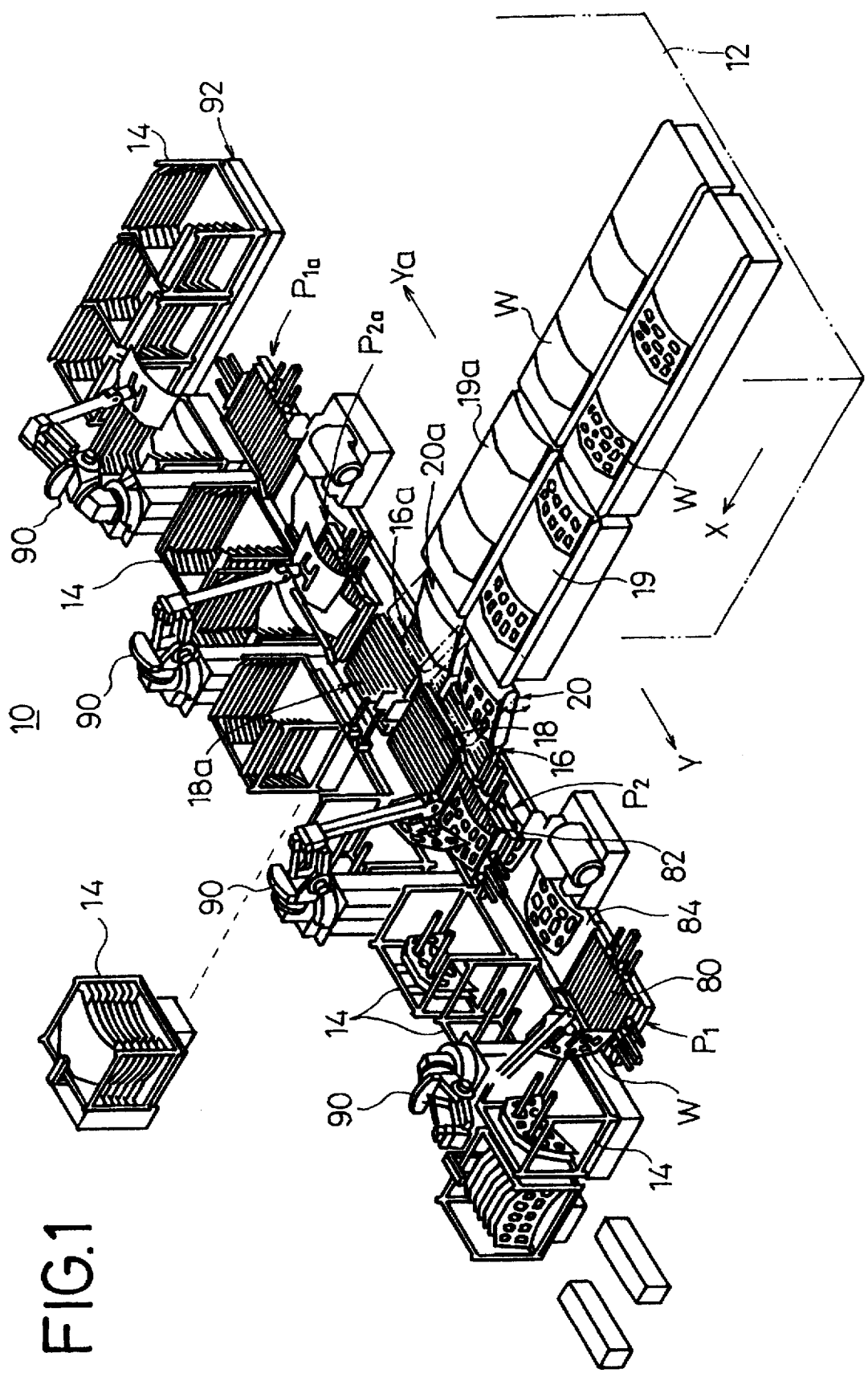
FIG. 1 is a perspective view of an automatic conveying apparatus according to the present invention.

As shown in FIG. 1, an automatic conveying apparatus 10 according to the present invention serves to convey workpieces W delivered from a transfer press 12 selectively to a pair of laterally spaced, first discharge positions P1, P1a and a pair of laterally spaced, second discharge positions P2, P2a for loading the workpieces W at respective attitudes into pallets 14 in the first discharge positions P1, P1a and the second discharge positions P2, P2a. The automatic conveying apparatus 10 comprises lower conveyors (second conveyors) 16, 16a and upper conveyors (first conveyors) 18, 18a which are disposed respectively in two vertically spaced positions, and a pair of distribution conveyors 20, 20a for distributing the workpieces W which have been delivered from the transfer press 12 through two rows of delivery conveyors (delivery means) 19, 19a, selectively to the lower conveyors 16, 16a and the upper conveyors 18, 18a.

The lower conveyor 16, the upper conveyor 18, and the distribution conveyor 20, which are positioned on the left-hand side as shown in FIG. 1, will be described below. The lower conveyor 16a, the upper conveyor 18a, and the distribution conveyor 20a, which are positioned on the right-hand side as shown in FIG. 1, are identical respectively to the lower conveyor 16, the upper conveyor 18, and the distribution conveyor 20, and hence will not be described in detail below.

Figure 2:
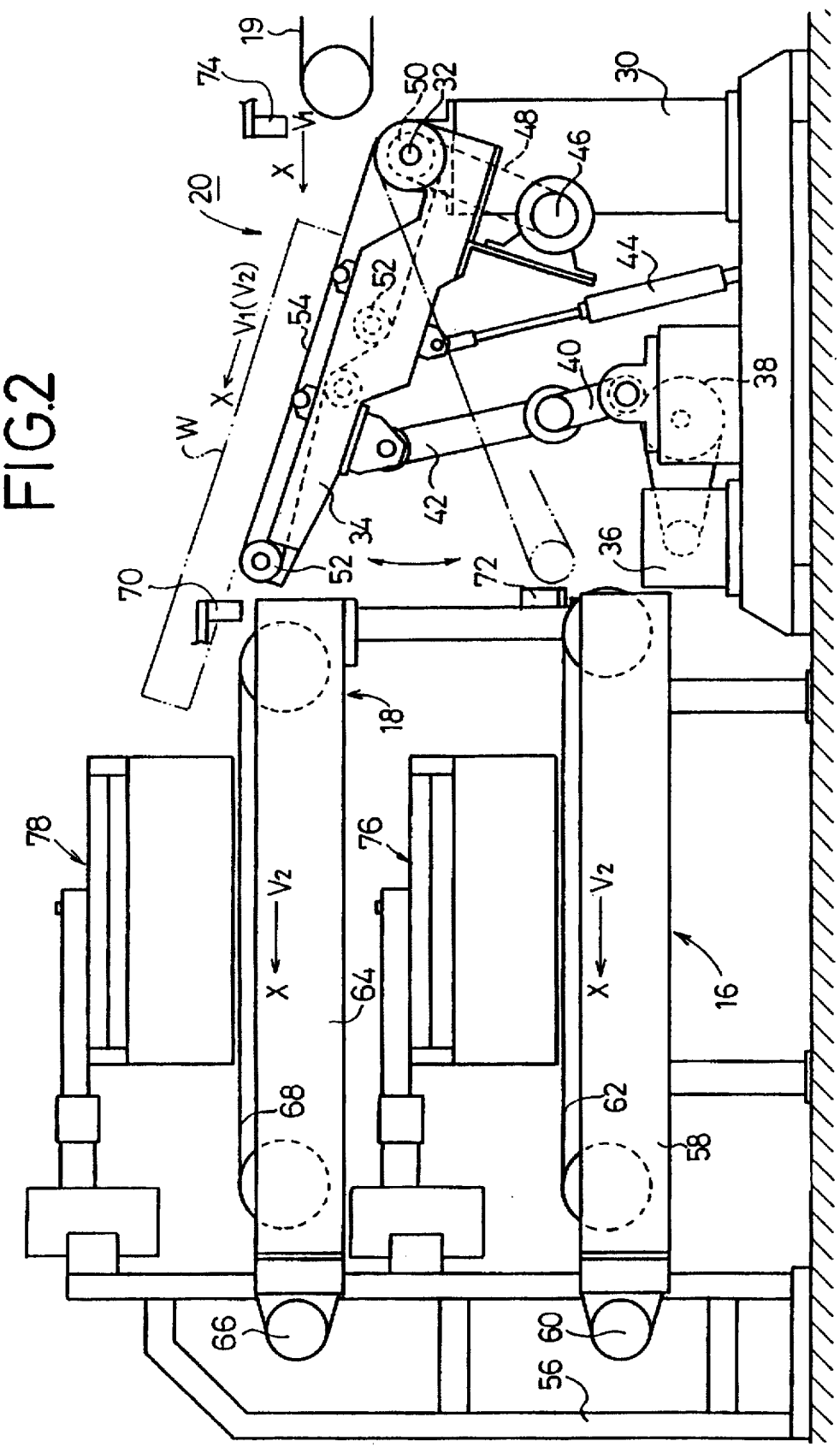
FIG. 2 is a side elevational view of a distribution conveyor, a lower conveyor, and an upper conveyor of the automatic conveying apparatus.

As shown in FIG. 2, the distribution conveyor 20 has a vertical post 30 fixedly mounted on a base near an end of the delivery conveyor 19, a horizontal shaft 32 rotatably mounted on an upper end of the vertical post 30, and a frame 34 having an end fixed to the horizontal shaft 32. The distribution conveyor 20 also has a rotative drive source 36 such as an electric motor disposed below the frame 34, a crank 40 angularly movably coupled at one end to a gear train 38 connected to the rotative drive source 36, a rod 42 angularly movably coupled at one end to the other end of the crank 40, the rod 42 having the other end angularly movably connected to a lower surface of the frame 34. A balancer 44 is connected between the base and the lower surface of the frame 34 for normally urging the frame 34 to move upwardly.

A drive motor (actuating means) 46 whose rotational speed is variable under an inverter control is fixed to the frame 34 at its lower surface below the pivoted end thereof which is connected to the horizontal shaft 32. The drive motor 46 is operatively connected to a drive pulley 50 through a drive transmission mechanism 48 such as a chain and sprockets, the drive pulley 50 being attached coaxially to the horizontal shaft 32. An endless belt 54 is trained around the drive pulley 50 and a plurality of pulleys 52 rotatably mounted on the frame 34.

The lower conveyor 16 has a lower frame 58 supported horizontally by a vertical post 56, and a drive motor 60 fixed to an end of the lower frame 58. The drive motor 60 has a rotatable shaft operatively connected to a steel slat belt 62 through a drive transmission mechanism such as a belt, a chain, or the like (not shown). When the drive motor 60 is energized, the steel slat belt 62 moves through a circulatory path in the direction indicated by the arrow X.

The upper conveyor 18 has an upper frame 64 positioned above the lower frame 58 and supported horizontally by the vertical post 56, and a drive motor 66 fixed to an end of the upper frame 64. The drive motor 66 has a rotatable shaft operatively connected to a steel slat belt 68 through a drive transmission mechanism such as a belt, a chain, or the like (not shown). When the drive motor 66 is energized, the steel slat belt 68 moves through a circulatory path in the direction indicated by the arrow X.

A first photoelectric sensor (first workpiece sensor) 70 for detecting a workpiece is positioned over the upper conveyor 18 in the vicinity of the distal end of the distribution conveyor 20 as it is turned upwardly. A second photoelectric sensor (second workpiece sensor) 72 for detecting a workpiece is positioned over the lower conveyor 16 in the vicinity of the distal end of the distribution conveyor 20 as it is turned downwardly. The first and second photoelectric sensors 70, 72 jointly constitute a detecting means. A photoelectric sensor 74 for detecting a delivered workpiece is positioned over the pivoted end of the frame 34 near the delivery conveyor 19.

The vertical post 56 supports thereon a lower pusher 76 positioned above the lower conveyor 16 and movable back and forth in the direction indicated by the arrow Y (FIG. 1) across the circulatory path of the steel slat belt 62, and an upper pusher 78 positioned above the upper conveyor 18 and movable back and forth in the direction indicated by the arrow Y across the circulatory path of the steel slat belt 68.

As illustrated in FIG. 1, steel slat belts 80, 82 movable through respective circulatory paths in the direction indicated by the arrow Y are disposed respectively in the first and second discharge positions P1, P2. A transfer conveyor 84 (see also FIG. 3) is disposed near and between an end of the lower conveyor 16 and the first discharge position P1. Loading robots 90 are also disposed in the first and second discharge positions P1, P2, with pallets 14 positioned on opposite sides of the loading robots 90. An empty pallet stock area 92 is located near the first discharge position P1a for cyclically using the pallets 14.

Operation of the automatic conveying apparatus 10 to carry out an automatic conveying method according to the present invention will be described below with reference to FIG. 4.

As shown in FIG. 1, workpieces W delivered from the transfer press 12 are placed on the delivery conveyors 19, 19a and delivered thereby in the direction indicated by the arrow X. While the workpieces W are being thus delivered, they are inspected for pressed quality by inspectors. If no defects are found on the workpieces W, then they are fed onto the distribution conveyors 20, 20a.

The delivery conveyor 19 is moved through its circulatory path at a relatively low first speed $V_1$ (see FIG. 1) by a drive motor (not shown), and the endless belt 54 of the distribution conveyor 20 is moved at the same first speed $V_1$ by the drive motor 46. The steel slat belts 62, 68 of the lower and upper conveyors 16, 18 are moved through their circulatory paths at a second speed $V_2$ which is greater than the first speed $V_1$ by the respective drive motors 60, 66.

When a workpiece W is transferred from the delivery conveyor 19 onto the distribution conveyor 20, the photoelectric sensor 74 is turned on, and the workpiece W is fed in the direction indicated by the arrow X by the endless belt 54 which is running at the first speed $V_1$. As shown in FIG. 5, when the leading end of the workpiece W fed by the distribution conveyor 20 moves to the upper conveyor 18, turning on the first photoelectric sensor 70, the drive motor 46 is switched under inverter control to actuate the endless belt 54 at the second speed $V_2$ which is greater than the first speed $V_1$.

Therefore, the workpiece W is now fed in the direction indicated by the arrow X at the relatively high second speed $V_2$. When the trailing end of the workpiece W moves across the first photoelectric sensor 70, the first photoelectric sensor 70 is turned off. The workpiece W is now transferred onto the upper conveyor 18. At the same time, the distribution conveyor 20 is switched to move at the relatively low first speed $V_1$, and turned downwardly toward the lower conveyor 16. Specifically, as shown in FIG. 2, the rotative drive source 36 is energized to turn the crank 40, angularly moving downwardly the distal end of the frame 34 connected to the rod 42 until the distribution conveyor 20 is directed to the lower conveyor 16 as shown in FIG. 6.

After the first photoelectric sensor 70 is turned on by the workpiece W conveyed by the distribution conveyor 20 onto the upper conveyor 18, the workpiece W is conveyed at the relatively high second speed $V_2$ by the distribution conveyor 20, and is also conveyed at the relatively high second speed $V_2$ by the upper conveyor 18. When the first photoelectric sensor 70 is turned off by the trailing end of the workpiece W that moves across the first photoelectric sensor 70, the distribution conveyor 20 starts moving at the relatively low first speed $V_1$. Therefore, a next workpiece W1 (see FIG. 6) delivered from the delivery conveyor 19 onto the distribution conveyor 20 is conveyed at the relatively low first speed $V_1$ by both the delivery conveyor 19 and the distribution conveyor 20. Consequently, the workpieces W, W1 are spaced an increased distance from each other. As a result, when the distribution conveyor 20 is angularly moved downwardly as shown in FIG. 6, the next workpiece W1 on the distribution conveyor 20 is not caught by the upper conveyor 18.

When the leading end of the workpiece W1 conveyed at the first speed $V_1$ by the distribution conveyor 20 turns on the second photoelectric sensor 72, the drive motor 46 is switched to operate the distribution conveyor 70 at the relatively high second speed $V_2$. The workpiece W1 is then transferred from the distribution conveyor 20 onto the lower conveyor 16 which is moving at the second speed $V_2$. When the second photoelectric sensor 72 is turned off by the trailing end of the workpiece W1, the distribution conveyor 70 is switched to move at the first speed $V_1$, and angularly moved upwardly toward the upper conveyor 18.

Inasmuch as a workpiece W2 following the workpiece W1 is conveyed at the first speed $V_1$ by both the delivery conveyor 19 and the distribution conveyor 20, the distance between the workpieces W1, W2 is increased. The workpiece W is not caught by the upper conveyor 18 upon angular movement of the distribution conveyor 20 up to the upper conveyor 18.

As described above, workpieces W successively delivered at the first speed $V_1$ from the transfer press 12 by the delivery conveyor 19 are conveyed at the relatively high second speed $V_2$ after the photoelectric sensor 70 or 72 is turned on until it is turned off. Therefore, the successive workpieces W can smoothly be conveyed from the distribution conveyor 20 onto the upper conveyor 18 or the lower conveyor 16. Since each of the workpieces W and a following workpiece W1 are spaced an increased distance from each other on the distribution conveyor 20, the next workpiece W1 can reliably be conveyed without fail.

Because of the speed switching capability of the distribution conveyor 20, it is possible to deliver workpieces W at relatively short intervals from the delivery conveyor 19 to the distribution conveyor 20. This allows the transfer press 12 to press workpieces at a high speed. The speed switching capability of the distribution conveyor 20 also makes it possible to convey various types of workpieces W having different dimensions and shapes.

The first and second photoelectric sensors 70, 72 may be replaced with any of various other switches. Furthermore, the first photoelectric sensor 70 may be mounted on the distal end of the distribution conveyor 20 for angular movement therewith.

Although a certain preferred embodiment of the present invention has been shown and described in detail, it should be understood that various changes and modifications may be made therein without departing from the scope of the appended claims.

What is claimed is:

1. A method of automatically conveying workpieces, comprising the steps of:

directing a distribution conveyor for distributing and conveying a workpiece delivered from a machining device to a first conveyor and a second conveyor which are disposed respectively in two vertically spaced positions, toward said first conveyor, and operating said distribution conveyor at a first speed;

actuating said distribution conveyor at a second speed greater than said first speed when the leading end of the workpiece conveyed by said distribution conveyor is detected by a first sensor as being moved to said first conveyor;

actuating said distribution conveyor at said first speed and directing the distribution conveyor toward said second conveyor when the trailing end of the workpiece conveyed by said distribution conveyor is detected by said first sensor as being moved to said first conveyor;

actuating said distribution conveyor at said second speed when the leading end of another workpiece conveyed by said distribution conveyor is detected by a second sensor as being moved to said second conveyor; and actuating said distribution conveyor at said first speed and directing the distribution conveyor toward said first conveyor when the trailing end of the other workpiece conveyed by said distribution conveyor is detected by said second sensor as being moved to said second conveyor.

2. The method according to claim 1, further comprising the steps of:

actuating delivery means for delivering workpieces from the machining device to said distribution conveyor, at said first speed; and actuating said first conveyor and said second conveyor at said second speed.

3. An apparatus for automatically conveying workpieces, comprising:

a first conveyor and a second conveyor which are disposed respectively in two vertically spaced positions;

a distribution conveyor angularly displaceable selectively toward said first conveyor and said second conveyor for distributing and conveying a workpiece delivered from a machining device to said first conveyor or said second conveyor;

actuating means for actuating said distribution conveyor selectively at a first speed and a second speed greater than said first speed; and detecting means for detecting the workpiece as being moved from said distribution conveyor to said first conveyor or said second conveyor.

4. The apparatus according to claim 3, wherein said distribution conveyor comprises:

a conveyor belt;

angularly moving means, composed of a rotative drive source and a crank connected thereto, for angularly moving said conveyor belt; and a balancer for normally urging said conveyor belt upwardly.

5. The apparatus according to claim 3, wherein said actuating means comprises a variable-speed drive motor.

6. The apparatus according to claim 3, wherein said detecting means comprises a pair of photoelectric sensors actuated when the leading end of the workpiece moves thereacross and, deactuated when the trailing end of the workpiece moves thereacross.

7. The apparatus according to claim 6, wherein one of said photoelectric sensors is disposed between said first conveyor and a distal end of said distribution conveyor as displaced toward said first conveyor, and the other of said photoelectric sensors is disposed between said second conveyor and the distal end of said distribution conveyor as displaced toward said second conveyor.

8. The apparatus according to claim 6, wherein said detecting means comprises a photoelectric sensor which can be turned on when the leading end of the workpiece moves thereacross and which can be turned off when the trailing end of the workpiece moves thereacross, said photoelectric sensor being disposed on a distal end of said distribution conveyor for angular displacement therewith.

* * * * *